(12) United States Patent
Arnison et al.

(10) Patent No.: US 10,019,810 B2
(45) Date of Patent: Jul. 10, 2018

(54) METHOD, SYSTEM AND APPARATUS FOR DETERMINING A DEPTH VALUE OF A PIXEL

(71) Applicant: CANON KABUSHIKI KAISHA, Tokyo (JP)

(72) Inventors: Matthew Raphael Arnison, Umina Beach (AU); Ernest Yiu Cheong Wan, Carlingford (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/552,364

(22) Filed: Nov. 24, 2014

(65) Prior Publication Data

US 2015/0146994 A1    May 28, 2015

(30) Foreign Application Priority Data

Nov. 28, 2013  (AU) ................................ 2013263760

(51) Int. Cl.
*G06T 7/571*    (2017.01)

(52) U.S. Cl.
CPC .... *G06T 7/571* (2017.01); *G06T 2207/10016* (2013.01); *G06T 2207/10148* (2013.01); *G06T 2207/20224* (2013.01)

(58) Field of Classification Search
None
See application file for complete search history.

(56) References Cited

U.S. PATENT DOCUMENTS

2001/0055407 A1\* 12/2001 Rhoads ............. G06F 17/30876
382/100

2010/0053417 A1\* 3/2010 Baxansky .......... H04N 5/23212
348/345

(Continued)

FOREIGN PATENT DOCUMENTS

| KR | 20100068751 A | \* | 6/2010 | |
| WO | WO 2006033084 A2 | \* | 3/2006 | ........... G06T 3/4007 |
| WO | WO 2013105562 A1 | \* | 7/2013 | ......... H04N 13/0011 |

OTHER PUBLICATIONS

Alex Paul Pentland: "A New Sense for Depth of Field," IEEE Transactions on IEEE Pattern Analysis and Machine Intelligence, Jul. 1987, PAMI-9(4): 523-531, IEEE, Piscataway, NJ, 1987.
Ens, John, Peter Lawrence: "An investigation of methods for determining depth from focus," IEEE Transactions on IEEE Pattern Analysis and Machine Intelligence, Feb. 1993, 5(2):97-108, IEEE, Piscataway, NJ, 1993.

(Continued)

*Primary Examiner* — Feng Niu
*Assistant Examiner* — Jiangeng Sun
(74) *Attorney, Agent, or Firm* — Canon U.S.A., Inc. IP Division

(57) ABSTRACT

A method of determining a depth value of a fine structure pixel in a first image of a scene using a second image of the scene is disclosed. A gradient orientation for each of a plurality of fine structure pixels in the first image is determined. Difference images are generated from the second image and a series of blurred images formed from the first image, each difference image corresponding to one of a plurality of depth values. Each of the difference images is smoothed, in accordance with the determined gradient orientations, to generate smoothed difference images having increased coherency of fine structure. For each of a plurality of fine structure pixels in the first image, one of the smoothed difference images is selected. The depth value of the fine structure pixel corresponding to the selected smoothed difference image is determined.

24 Claims, 11 Drawing Sheets

(56) References Cited

U.S. PATENT DOCUMENTS

| | | | | |
|---|---|---|---|---|
| 2012/0039525 | A1* | 2/2012 | Tian | G06T 5/005 |
| | | | | 382/154 |
| 2012/0154668 | A1* | 6/2012 | Kimura | G01C 3/32 |
| | | | | 348/348 |
| 2013/0300860 | A1* | 11/2013 | Komatsu | G06T 7/0069 |
| | | | | 348/135 |
| 2013/0342671 | A1* | 12/2013 | Hummel | G06K 9/6202 |
| | | | | 348/77 |
| 2014/0063188 | A1* | 3/2014 | Smirnov | H04N 13/0018 |
| | | | | 348/43 |
| 2014/0118494 | A1* | 5/2014 | Wu | G06T 7/0065 |
| | | | | 348/44 |

OTHER PUBLICATIONS

Yalin Xiong, Steven A. Shafer: "Depth from Focusing and Defocusing," The Robotics Institute Carnegie Mellon University Pittsburgh, PA 15213, 1993, 1063-6919/93, IEEE, Piscataway, NJ, 1993; pp. 68-73.

Favaro, Paolo: "Recovering Thin Structures via Nonlocal-Means Regularization with Application to Depth from Defocus," Computer Vision and Pattern Recognition (CVPR), 2010 IEEE Conference on. IEEE, 2010; pp. 1133-1140.

Kyprianidis, Jan Eric, and Jurgen Dollner: "Image Abstraction by Structure Adaptive Filtering," TPCG. 2008.

McCloskey, Scott P; "Investigating Blur in the Framework of Reverse Projection," McGill University, 2007; pp. 1-141.

* cited by examiner

METHOD, SYSTEM AND APPARATUS FOR DETERMINING A DEPTH VALUE OF A PIXEL

REFERENCE TO RELATED PATENT APPLICATION(S)

This application claims the benefit under 35 U.S.C. § 119 of the filing date of Australian Patent Application No. 2013263760, filed 28 Nov. 2013, hereby incorporated by reference in its entirety as if fully set forth herein.

TECHNICAL FIELD

The current invention relates to digital image processing and, in particular, to determining a depth value of a fine structure pixel in a first image of a scene. The present invention also relates to a method and apparatus for determining a depth value of a fine structure pixel in a first image of a scene, and to a computer program product including a computer readable medium having recorded thereon a computer program for determining a depth value of a fine structure pixel in a first image of a scene.

BACKGROUND

In many applications of image capture, it can be advantageous to determine the distance from an image capture device to objects within a field of view of the image capture device. A collection of such distances to objects in an imaged scene is sometimes referred to as a "depth map". A depth map of an imaged scene may be represented as an image, which may be of a different pixel resolution to the image of the scene itself. The distance to objects corresponding to each pixel of the depth map is represented by a greyscale or colour value.

A depth map can be useful in the fields of photography and video image capture, as a depth map enables several desirable post-capture image processing capabilities. For example, a depth map can be used to segment foreground and background objects to allow manual post-processing, or automated application of creative visual effects. A depth map can also be used to apply depth-related visual effects such as simulating aesthetically pleasing graduated blur of a high-quality lens using a smaller and less expensive lens.

In the fields of professional photography and video image capture, visual effects need to be high quality. A significant issue when using foreground segmentation masks for visual effects is the accuracy of segmentation around "fine structure" at the edge of a subject, such as hair around the face of the subject. Errors in fine structure segmentation can cause artefacts which are highly visible in a processed image.

Depth estimation may be performed by "depth from defocus (DFD)" using a single camera by capturing two images with different focus or aperture settings and analysing relative blur between the two images. Depth from defocus (DFD) uses a single standard camera without special hardware modifications. The same single standard camera can be used for image or video capture and also for depth capture.

A first conventional method for depth from defocus (DFD) involves estimating relative blur by dividing the spatial frequency spectrum of regions in a first image by a spectrum of regions in a second image, creating a spectral ratio. Such a method approximately cancels out scene spectrum and allows a change in optical transfer function between the first and second images to be estimated. However, this first conventional depth from defocus (DFD) method requires Fourier transforming a square region of an image and creates a single depth estimate for that square region. A resulting depth map has lower resolution than the first and second images and fine structure is not resolved.

Another conventional method for depth from defocus (DFD) involves convolving a series of relative blur kernels with one image and subtracting resulting images from a second captured image to create a series of blur difference images. A minimum blur difference value across the blur difference images for each region is used to find a best estimate of relative blur for that region. However, the blur difference images generated by this second conventional method are extremely noisy.

A first method of compensating for noise in the blur difference images described above is to average the blur difference images over square regions before finding a minimum blur difference value. This square region averaging creates a low resolution depth map in which fine structure is not resolved.

Another method of compensating for blur difference noise is to apply an error minimisation method. In this error minimisation method, a data error term is created using the blur difference. A total variation error term based on depth map gradient magnitude is used to penalise depth maps that are not piecewise smooth. A neighbourhood regularisation term is used to apply a non-local means filter based on the assumption that pixels with similar colours are likely to be similar depths. The non-local means filter uses an elliptical Gaussian window to allow the tracing of fine structure. However, the error minimisation method requires a complex algorithm which takes a long time to process. Further, the error minimisation method uses colour to identify fine structure, which may fail if there are similar colours in the background behind the fine structure. The elliptical window has a finite width along the minor axis, which may limit the resolution of fine structure.

Another method of compensating for the blur difference noise discussed above is to iteratively apply both spectral ratio and blur difference to estimate relative blur, until the relative blur converges to a stable result. However, the use of the spectral ratio means that a resulting depth map is low resolution and fine structure will not be resolved.

SUMMARY

It is an object of the present invention to substantially overcome, or at least ameliorate, one or more disadvantages of existing arrangements.

Disclosed are arrangements which seek to address the above problems by determining depth of fine structure at the edge of a subject of a captured image, using depth from defocus (DFD). Two images are captured (i.e., a first and second captured image) of a scene using different focus or aperture settings. A gradient orientation image is generated from the first captured image. A series of blur difference images are generated by subtracting the second captured image from a series of convolutions of estimated relative blur kernels with the first captured image. Edge tangent convolution is applied to the series of blur difference images, which increases the coherence of blur difference signal for fine structure. Edge tangent convolution is the application of one dimensional Gaussian blur kernels to each pixel, where orientation of a blur kernel is controlled by a gradient orientation image. The relative blur for each pixel in the first captured image is estimated by searching for the minimum value in a blur difference series for each pixel. The relative blur is then used to determine a depth for each pixel. Because of increased coherence of the blur difference for fine structure, resulting depth estimates have high accuracy and are more consistent along fine structure such as hair.

In one aspect of the present disclosure, a confidence signal is generated for each pixel by calculating the difference between maximum blur difference and minimum blur difference for each pixel. The confidence signal is very high resolution, and can be used to isolate a confident depth signal for fine structure such as individual hair strands.

According to one aspect of the present disclosure, there is provided a method of determining a depth value of a fine structure pixel in a first image of a scene using a second image of the scene, the method comprising:

determining a gradient orientation for each of a plurality of fine structure pixels in the first image;

generating difference images from the second image and a series of blurred images formed from said first image, each said difference image corresponding to one of a plurality of depth values;

smoothing each of the difference images, in accordance with the determined gradient orientations, to generate smoothed difference images having increased coherency of fine structure;

selecting, for each of a plurality of fine structure pixels in the first image, one of said smoothed difference images; and determining the depth value of the fine structure pixel corresponding to the selected smoothed difference image.

According to another aspect of the present disclosure, there is provided an apparatus for determining a depth value of a fine structure pixel in a first image of a scene using a second image of the scene, the apparatus comprising:

a memory for storing data and a computer program;

a processor coupled to the memory for executing the computer program, the computer program having instructions for:

determining a gradient orientation for each of a plurality of fine structure pixels in the first image;

generating difference images from the second image and a series of blurred images formed from said first image, each said difference image corresponding to one of a plurality of depth values;

smoothing each of the difference images, in accordance with the determined gradient orientations, to generate smoothed difference images having increased coherency of fine structure;

selecting, for each of a plurality of fine structure pixels in the first image, one of said smoothed difference images; and determining the depth value of the fine structure pixel corresponding to the selected smoothed difference image.

According to still another aspect of the present disclosure, there is provided a computer readable medium comprising a computer program stored thereon for determining a depth value of a fine structure pixel in a first image of a scene using a second image of the scene, the program comprising:

code for determining a gradient orientation for each of a plurality of fine structure pixels in the first image;

code for generating difference images from the second image and a series of blurred images formed from said first image, each said difference image corresponding to one of a plurality of depth values;

code for smoothing each of the difference images, in accordance with the determined gradient orientations, to generate smoothed difference images having increased coherency of fine structure; and code for selecting, for each of a plurality of fine structure pixels in the first image, one of said smoothed difference images; and code for determining the depth value of the fine structure pixel corresponding to the selected smoothed difference image.

According to still another aspect of the present disclosure, there is provided a method of determining a confidence value of a fine structure pixel in a first image of a scene using a second image of the scene, the method comprising:

generating difference images from the second image and a series of blurred images formed from said first image, each said difference image corresponding to one of a plurality of depth values; and determining the confidence value of the fine structure pixel based on a difference between a maximum subset of difference values of the difference images and a minimum subset of pixel values of the difference images.

According to still another aspect of the present disclosure, there is provided an apparatus for determining a confidence value of a fine structure pixel in a first image of a scene using a second image of the scene, the apparatus comprising:

a memory for storing data and a computer program;

a processor coupled to the memory for executing the computer program, the computer program having instructions for:

generating difference images from the second image and a series of blurred images formed from said first image, each said difference image corresponding to one of a plurality of depth values; and determining the confidence value of the fine structure pixel based on a difference between a maximum subset of difference values of the difference images and a minimum subset of pixel values of the difference images.

According to still another aspect of the present disclosure, there is provided a computer readable medium comprising a computer program stored thereon for determining a confidence value of a fine structure pixel in a first image of a scene using a second image of the scene, the program comprising:

code for generating difference images from the second image and a series of blurred images formed from said first image, each said difference image corresponding to one of a plurality of depth values; and code for determining the confidence value of the fine structure pixel based on a difference between a maximum subset of difference values of the difference images and a minimum subset of pixel values of the difference images.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1A:
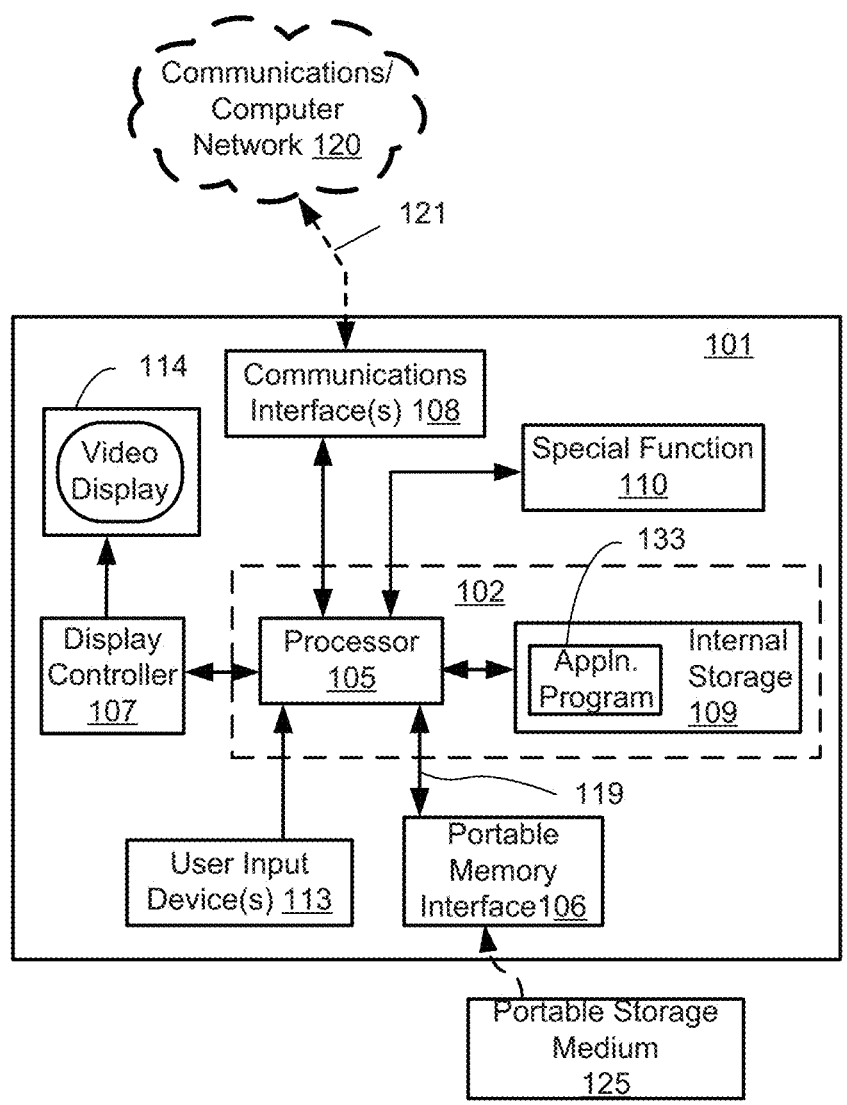
FIGS. 1A and 1B collectively form a schematic block diagram representation of an electronic device upon which described arrangements can be practised.

Where reference is made in any one or more of the accompanying drawings to steps and/or features, which have the same reference numerals, those steps and/or features have for the purposes of this description the same function(s) or operation(s), unless the contrary intention appears.

The present disclosure is directed to providing methods of extracting a depth map from two images of a scene captured using a single camera with different camera capture parameters and substantially located at the same position. The described methods seek to offer one or more of improved accuracy and improved spatial resolution of the depth map.

The arrangements presently disclosed may be implemented on a variety of hardware platforms, including in an image capture device such as a digital camera, or on a general purpose computer (PC), or in a cloud computing implementation.

Figure 1B:
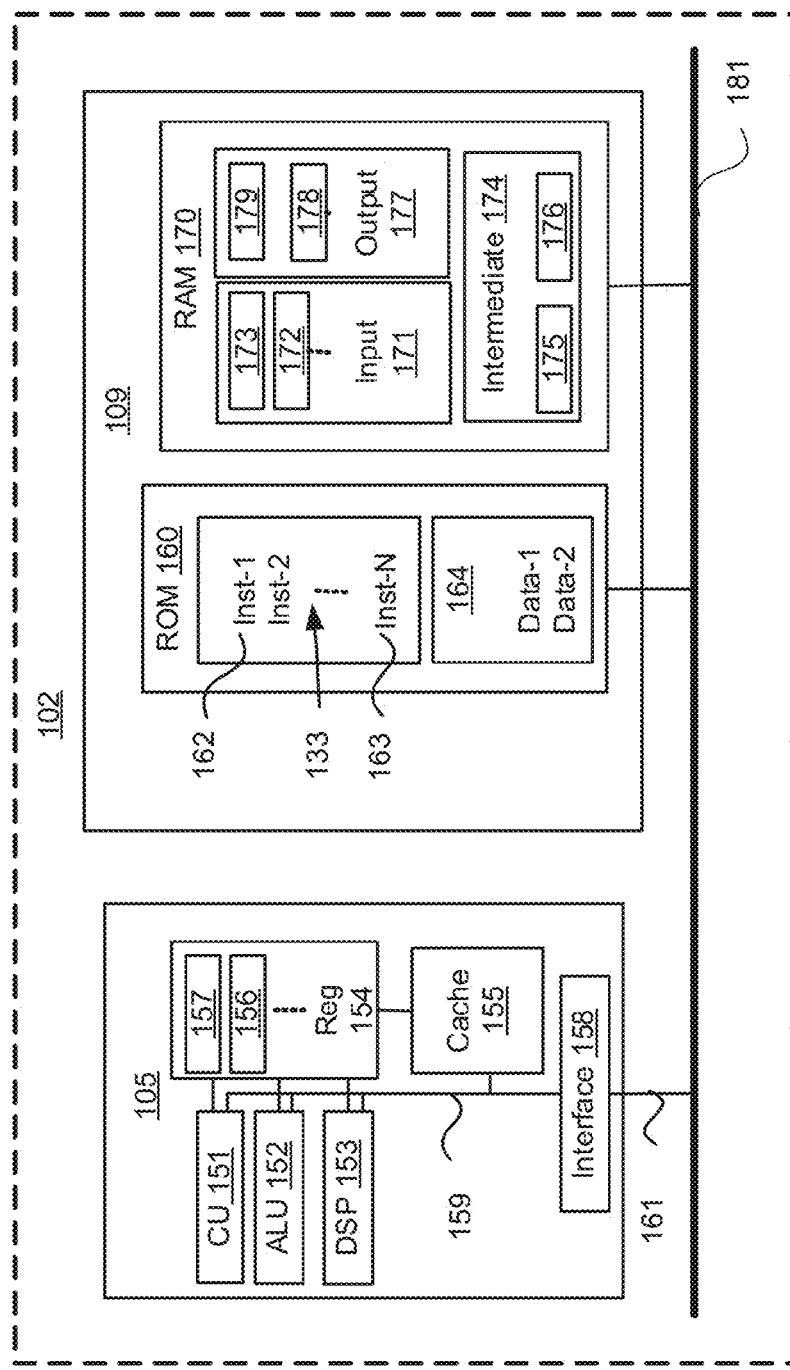

FIGS. 1A and 1B collectively form a schematic block diagram of a general purpose electronic device 101 including embedded components, upon which the methods to be described are desirably practiced. The electronic device 101 may be, for example, a digital camera or a mobile phone, in which processing resources are limited. Nevertheless, the methods to be described may also be performed on higher-level devices such as desktop computers, server computers (e.g., in a cloud computing implementation), and other such devices with significantly larger processing resources.

As seen in FIG. 1A, the electronic device 101 comprises an embedded controller 102. Accordingly, the electronic device 101 may be referred to as an "embedded device." In the present example, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 1B. The RAM 170 may be volatile, non-volatile or a combination of volatile and non-volatile memory.

The electronic device 101 includes a display controller 107, which is connected to a video display 114, such as a liquid crystal display (LCD) panel or the like. The display controller 107 is configured for displaying graphical images on the video display 114 in accordance with instructions received from the embedded controller 102, to which the display controller 107 is connected.

The electronic device 101 also includes user input devices 113 which are typically formed by keys, a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1A, the electronic device 101 also comprises a portable memory interface 106, which is coupled to the processor 105 via a connection 119. The portable memory interface 106 allows a complementary portable memory device 125 to be coupled to the electronic device 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 101 also has a communications interface 108 to permit coupling of the device 101 to a computer or communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 101 is configured to perform some special function. The embedded controller 102, possibly in conjunction with further special function components 110, is provided to perform that special function. For example, as described here, the device 101 is configured as an image capture device in the form of a digital camera where the components 110 represent a lens, focus control and image sensor of the digital camera. The special function components 110 are connected to the embedded controller 102.

In another arrangement, the device 101 may be a mobile telephone (or "smartphone") handset. In this instance, the components 110 may represent those components required for communications in a cellular telephone environment.

Where the device 101 is a portable device, the special function components 110 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 102, where the processes of FIGS. 2 to 12 may be implemented as one or more software application programs 133 executable within the embedded controller 102. The electronic device 101 of FIG. 1A implements the described methods. In particular, with reference to FIG. 1B, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the electronic device 101. However, in some instances, the application programs 133 may be supplied to the user encoded on one or more CD-ROM (not shown) and read via the portable memory interface 106 of FIG. 1A prior to storage in the internal storage module 109 or in the portable memory 125. In another alternative, the software application program 133 may be read by the processor 105 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of transitory or non-tangible computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 1A. Through manipulation of the user input device 113 (e.g., the keypad), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1B illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the electronic device 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the electronic device 101. Typically, the application program 133 waits for events and subsequently executes the block of code associated with that event. Events may be triggered in response to input from a user, via the user input devices 113 of FIG. 1A, as detected by the processor 105. Events may also be triggered in response to other sensors and interfaces in the electronic device 101.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code.

Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the electronic device 101.

The described methods incorporate depth from defocus (DFD) methods and may alternatively be implemented in whole or part in dedicated hardware such as one or more integrated circuits performing the functions or sub functions of the processes to be described. Such dedicated hardware may include graphic processors, digital signal processors, or one or more microprocessors and associated memories. For example, the electronic device 101, in the form of a digital camera may implement depth from defocus (DFD) algorithmic methods to be described in hardware or firmware in order to capture pairs of images with different camera parameters and to process the captured images to provide a depth map for various purposes. Such purposes may include artificially blurring the background of portrait images to achieve a pleasing aesthetic, or attaching depth information as image metadata to enable various post-processing operations. The electronic device 101 may be configured to capture multiple images of a scene, the images being suitable for application of the depth from defocus (DFD) processing. The depth from defocus (DFD) processing may occur in the embedded controller 102 of the device 101, and results may be retained in the internal storage module 109 of the device 101, written to a memory card or other memory storage device connectable to the device 101, or uploaded to a cloud computing server via the network 120 for later retrieval by the user.

In another example, a desktop computer or the like may implement the depth from defocus (DFD) processing in software to enable post-capture processing of images to generate depth estimates. The depth estimates may be used by a user for image segmentation or further image processing operations. In such a desktop computer arrangement, the device 101 captures multiple images of a scene in a traditional fashion, the images being suitable for application of the depth from defocus (DFD) process, and the images may be retained in the internal storage module 109 or written to a memory card or other memory storage device. In such a desktop computer arrangement, at a later time, the images may be transferred to a computer (e.g. via the network 120), where subsequent steps of the depth from defocus (DFD) process are executed using the transferred images as input.

In yet another example, a cloud computing server or the like may implement the depth from defocus (DFD) processing in software to enable post-capture processing of images to generate depth estimates. In such a cloud computer arrangement, the electronic device 101 captures multiple images of a scene in a traditional fashion. The images are uploaded to a cloud computing server, via the network 120, where subsequent steps of the depth from defocus (DFD) process use the uploaded images as input. The cloud computing server produces the depth maps and may then download the depth maps back to the electronic device 101, or store the depth maps for later retrieval by the user.

In other arrangements, the electronic device 101 may be used to capture two or more images with different camera parameters (or "image capture parameters"), the varying parameters being one or more of: focus, zoom, aperture, or any other camera setting that influences the amount of blur in the captured image. In the case of some parameters, such as zoom in particular but also focus and potentially other parameters, the magnification of the captured images may be different. One or more of the captured images may be scaled to bring the captured images substantially into registration before applying depth from defocus (DFD) processing to determine a depth map.

Depth estimation is effected by geometry and optics of imaging devices, such as the geometry and optics of the device 101. Most scenes that are captured using an image capture device, such as a camera, contain multiple objects, which are located at various distances from the lens of the device. Commonly, the image capture device is focused on an object of interest in the scene. The object of interest shall be referred to below as the subject of the scene.

Figure 2:
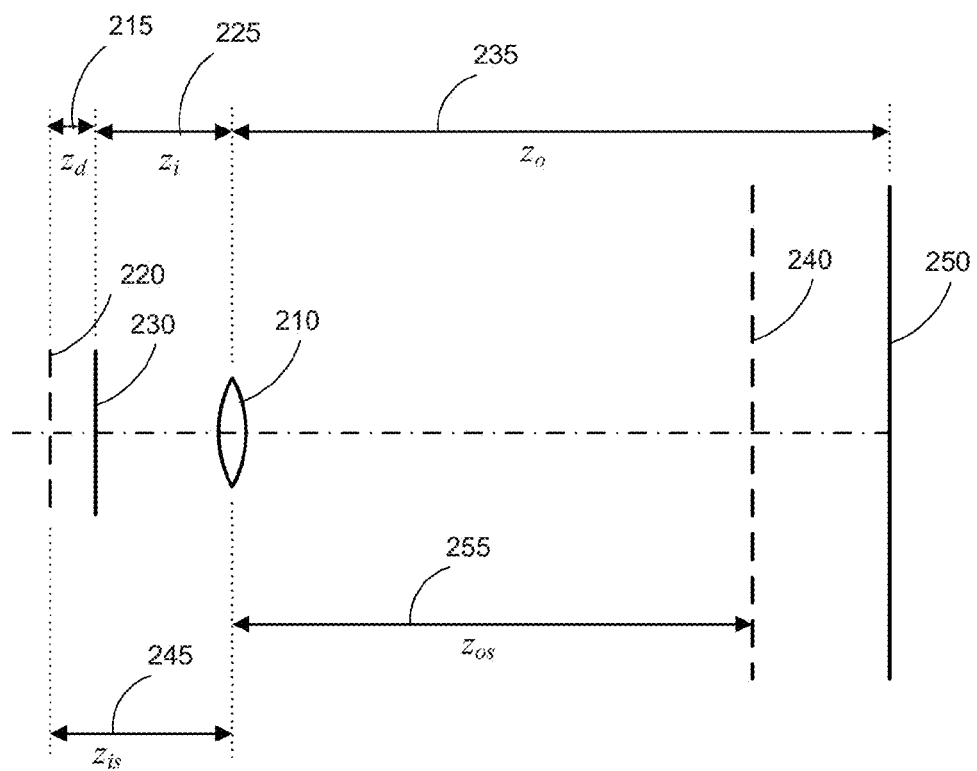
FIG. 2 is a schematic diagram illustrating the geometry of a lens forming two different images at two different focal planes.

FIG. 2 is a schematic diagram showing the geometrical relationships between a lens 210 of image capture device 101 and objects in a scene to be captured. An image sensor 230 of the device 101 is positioned at an image distance $z_i$ 225 behind the lens 210, which corresponds to an object distance $z_o$ 235 to an object plane 250 in the scene. Any parts of the scene in the object plane 250 will be at best focus in the image captured by the image sensor 230. A subject 240 at a different distance, subject distance $z_{os}$ 255, is at best focus at the image subject plane 220 which is at an image subject distance $z_{is}$ 245 behind the lens 210. The subject 240 will be blurred on the image sensor 230 by a blur radius σ which is proportional to image defocus distance $z_d$ 215. Distances between the image planes and corresponding object planes in the scene, including the object distance $z_o$ 235 and the image distance $z_i$ 225, are approximately determined by the thin lens law according to the Equation (1), as follows:

$$\frac{1}{z_i} + \frac{1}{z_o} = \frac{1}{f} \tag{1}$$

where f is focal length of the lens 210.

The point spread function (PSF) of the lens 210 can be modelled as a two-dimensional Gaussian function. In general the point spread functions of physical optical systems are not well approximated by Gaussian functions. However, for objects close to best focus of a typical camera lens a Gaussian point spread function can be a reasonable assumption. Under the Gaussian point spread function assumption, the standard deviation σ of the Gaussian can be regarded as a blur radius, providing a convenient quantitative measure of the concept of "amount of blur". The blur radius can be approximated using Equation (2), as follows:

$$\sigma = \frac{z_d f}{2 z_i A_v} \tag{2}$$

where $A_v$ is relative aperture of the lens 210.

The relationship of the Gaussian blur radius σ, subject distance $z_{os}$, and the image capture parameters of focal length f and lens aperture $A_v$ is given by Equation (3), as follows:

$$z_{os} = \frac{f z_i}{z_i - f - 2\sigma A_v}. \tag{3}$$

If the blur radius a of a point located at pixel coordinates $(x_i, y_i)$ in a captured image of a scene can be measured, the distance $z_{os}$ to an object at the corresponding point in the scene can be determined using Equation (3), provided the remaining quantities in Equation (3) are known.

Using Equation (3), depth information may be extracted using two captured images of the same scene, provided that the value of at least one parameter, in addition to blur radius a, differs between the two captured images, and provided that the difference in blur radius a between the images can be estimated. Such depth information extraction is used by the depth from defocus (DFD) methods described below, which rely on calculating relative defocus blur between two images of a scene.

Estimating the blur difference in depth from defocus may be described using a convolution model of noise-free image formation. A first captured image $g_1(x, y)$ of a scene $f(x, y)$ with spatial co-ordinates $(x, y)$ can be modelled using Equation (4), as follows:

$$g_1(x,y) = h(x,y;z_d,p_1) \otimes f(x,y) \quad (4)$$

where $\otimes$ denotes convolution and $h(x, y; z_d, p_1)$ is the defocus point spread function (PSF) for an object with image defocus distance $z_d$ captured with camera parameter (or "image capture parameter") $p_1$. The camera parameter $p_1$ may be any setting which changes the sensitivity of the point spread function (PSF) with respect to changes in image defocus distance. Example camera parameter settings with such a sensitivity changing property are shown in Equation (3) and include the lens focal length f, the lens focus distance $z_i$ and the lens aperture diameter A. A second captured image $g_2(x, y)$ of a scene $f(x, y)$ can be modelled using Equation (5), as follows:

$$g_2(x,y) = h(x,y;z_d,p_2) \otimes f(x,y) \quad (5)$$

where $\otimes$ denotes convolution and $h(x, y; z_d, p_2)$ is the defocus PSF for an object captured with camera parameter $p_2$.

Equations (3) and (4) may be expressed in the spatial frequency domain in accordance with Equations (6), as follows:

$$G_1(u,v) = H(u,v;z_d,p_1)F(u,v)$$

$$G_2(u,v) = H(u,v;z_d,p_2)F(u,v) \quad (6)$$

where capital letters denote Fourier transforms of corresponding lower case functions in the spatial domain, $G_1$ and $G_2$ are image spectra, H is an optical transfer function (OTF), F is scene spectrum, and (u, v) are co-ordinates in the spatial frequency domain. By assuming that the optical transfer function (OTF) and the scene spectra are non-zero, the ratio of the image spectra can be calculated in accordance with Equation (7), as follows:

$$\frac{G_2(u,v)}{G_1(u,v)} = \frac{H(u,v;z_d,p_2)F(u,v)}{H(u,v;z_d,p_1)F(u,v)} \quad (7)$$

$$= \frac{H(u,v;z_d,p_2)}{H(u,v;z_d,p_1)}$$

$$= H_{21}(u,v;z_d,p_1,p_2)$$

where $H_{21}$ is defined to be the relative optical transfer function (OTF). Equation (7) can be rearranged to give Equation (8), as follows:

$$G_2(u,v) = H_{21}(u,v;z_d,p_1,p_2)G_1(u,v) \quad (8)$$

which corresponds in the spatial domain to Equation (9), as follows:

$$g_2(x,y) = h_{21}(x,y;z_d,p_1,p_2) \otimes g_1(x,y) \quad (9)$$

where $h_{21}$ is the relative point spread function (PSF) or relative blur. The relative point spread function (PSF) may be calculated using the lens design and the known camera parameters $p_1$ and $p_2$. Alternatively, the relative point spread function (PSF) can be calibrated using captured images with known test scenes such as a pinhole. Equation (8) represents a spatial domain relationship between unknown image defocus distance $z_d$ and properties of known captured images, which does not depend on unknown captured scene f. The relationship represented by Equation (8) can be used to estimate image defocus distance $z_d$, and therefore object depth $z_s$.

One method of quantifying blur difference is to apply a series of estimated relative blurs to the first captured image and compare the result with the second captured image. Such a method can be called blur difference matching.

Equation (8) describes the relative blur between the first captured image and the second captured image. Equation (8) can be used to express the blur difference in accordance with Equation (10), as follows:

$$b(x,y;z_d) = [h_{21}(x,y;z_d,p_1,p_2) \otimes g_1(x,y) - g_2(x,y)]^2 \quad (10)$$

In the blur difference matching method, a set of difference images b is generated for a range of possible image defocus values in the scene represented in the first and second captured images. For each pixel, a search is performed for the image defocus value $z_d$ which minimises the blur difference for each pixel, producing a depth map d (x, y) in accordance with Equation (11), as follows:

$$d(x,y) = \arg\min_{z_d} b(x,y;z_d) \quad (11)$$

The depth map, d (x, y), is in units of image defocus relative to the focus distance of the lens 210. Image defocus distances can be converted to object distances from the device 101 using Equations (2) and (3).

The methods described here reduce the mixing of foreground and background depth signals and improve signal to noise ratio for regions of the image containing fine structure, compared to conventional methods.

Figure 3A:
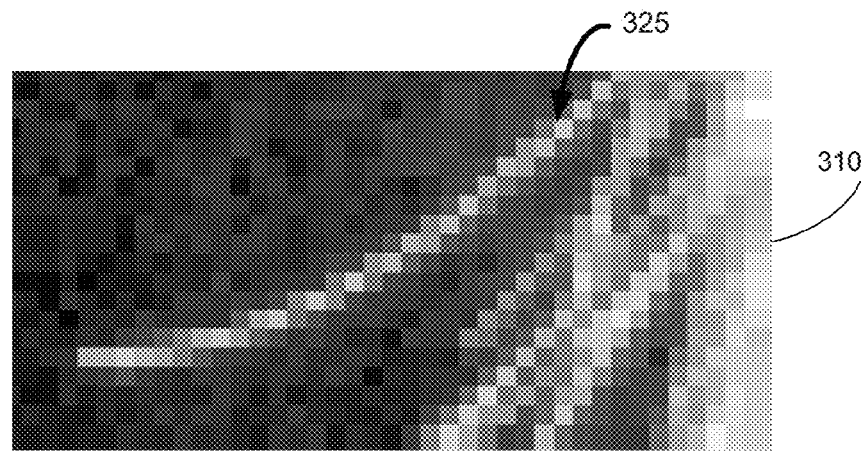
FIGS. 3A and 3B shows small regions from two example images captured of a portrait scene with different lens focus distances on a camera used to capture the images.
Figure 3B:
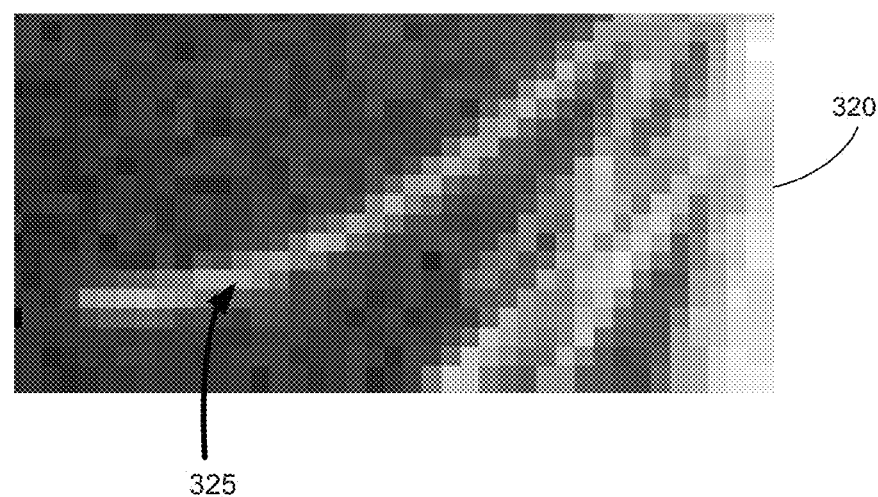

FIGS. 3A and 3B show small regions from two (2) example images 310 and 320 captured of a portrait scene with different lens focus distances on a camera used to capture the images. The first image 310 shown in FIG. 3A is captured with a best focus on the eyes of a subject. The second image 320 shown in FIG. 3B is captured with an image focus distance $z_i$ changed by 30 μm relative to the first image. Several fine features are visible in the image regions captured in the images 310 and 320. The fine features are single hairs of the subject. The hairs are approximately parallel to the image sensor of the device 101 used to capture the images 310 and 320. Therefore, the depth along the hairs is approximately constant. The aim of fine structure depth from defocus (DFD) is to estimate the depth of fine features, such as those shown in the images 310 and 320, with high accuracy and spatial resolution.

The blur difference matching method includes estimating a set of blur difference images for a series of depth values. A minimum in the set of blur difference images for a given image pixel indicates a solution for relative blur and hence depth.

As described here, the depth at the edge of a foreground object, or subject, seen against the background may be determined. For regions of an image near the edges of a foreground object, the region will include a mixed depth signal, including both foreground and background depths. In addition, images of a scene are captured by a camera with some amount of imaging noise. For a linear feature, blur difference images b are very noisy near a minimum with respect to $z_d$ because of the mixing of foreground and background signals by a blur kernel, and because the differences in relative blur are overwhelmed by image noise when the differences are small. The noise perturbs the blur difference heavily, and makes it difficult to correctly identify position of the minimum.

A thin linear feature in scene foreground will have a consistent depth along the feature, and therefore should have a consistent minimum in the set of blur different images. The consistency of the minimum can be improved by taking the mean of the blur difference values along the length of the linear feature.

Figure 5:
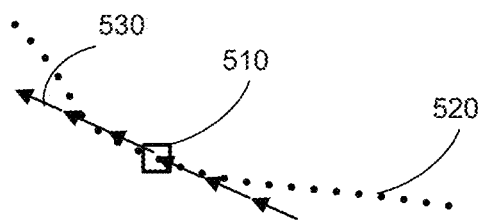
FIG. 5 is a diagram illustrating edge tangent convolution.

In practice, the exact shape of the linear feature is unknown. Instead, the local orientation of any fine features in a fine structure region of the first captured image is determined by calculating the local gradient orientations for each of a plurality of pixels of the first captured image. The gradient orientations are determined for each of the plurality of pixels. As described below, the gradient orientations may be determined using a smoothed local gradient. Alternatively, the gradient orientations may be determined using a gradient structure tensor. The local orientation is used to apply an edge tangent convolution (ETC) to the set of blur difference images, creating a set of smoothed blur difference images, which has the effect of performing an estimate of lengthwise mean along any fine features in a region. The edge tangent convolution (ETC) is a spatially varying one dimensional (1D) tangential convolution with a smoothing kernel such as a box function or Gaussian function. FIG. 5 illustrates the operation of edge tangent convolution (ETC) for a single pixel 510 lying on a fine structure feature 520 in a blur difference image. Tangential pixels 530 are multiplied by smoothing kernel values, and resulting values are summed to create a smoothed blur difference pixel value at 510.

The tangential convolution shown in FIG. 5 creates a more consistent blur difference signal along linear features in the smoothed blur difference, and a more consistent minimum surface along linear features across the set of smoothed blur difference images. The increase in consistency of the signal increases the coherency of fine structures in the smoothed blur difference images. The minimum blur difference is then identified for each pixel and mapped to a depth estimate. The resulting depth map is significantly more stable along fine structures, such as hair, captured in an image.

Figure 4A:
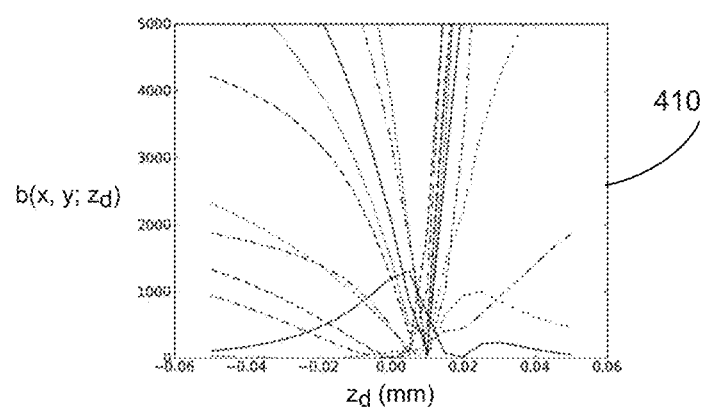
FIG. 4A shows a plot of raw blur difference image pixel values and depth estimate values for a fine structure feature.
Figure 4B:
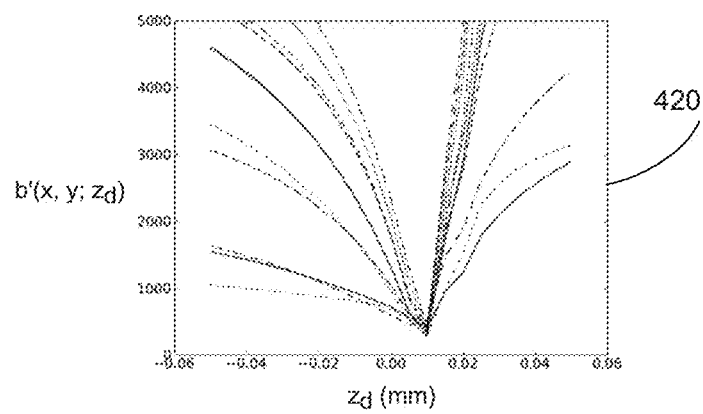
FIG. 4B shows a plot of smoothed blur difference values for the fine structure feature of FIG. 4A.
Figure 4C:
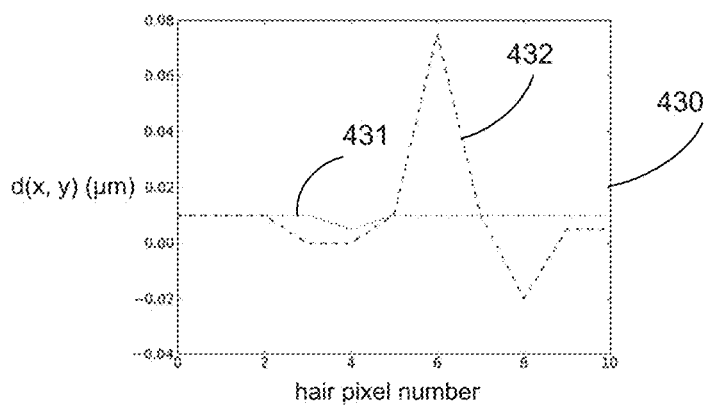
FIG. 4C shows a plot of depth estimate values for the fine structure feature of FIG. 4A.

FIGS. 4A, 4B and 4C show intermediate values of the blur match difference estimation method. FIG. 4A shows a raw blur difference plot 410 where values of blur difference images b(x, y; $z_d$) for a set of eleven (11) pixels manually selected along a long hair strand 325 shown in the images 310 and 320 of FIGS. 3A and 3B. In the example of FIG. 4A, each line on the plot 410 shows the variation of b(x, y; $z_d$) for a single pixel location along the hair strand 325. In the example of FIG. 4A, the pixels were manually selected for illustration purposes only. However, the methods described below do not require manual selection of pixels of the hair strand 325. The raw difference plot 410 shows how the minimum value varies widely for each hair pixel, even though the pixels were all selected from the same hair strand 325.

FIG. 4C shows a depth estimate plot 430 including a line 432 for the result of raw blur difference matching for the selected pixels along the hair 325. The depth estimate values plotted in the plot 430 show significant variation which indicates errors in depth estimates because the depth of the hair pixels in the scene of FIGS. 3A and 3B is approximately constant.

FIG. 4B shows a smoothed blur difference plot 420 of values of smoothed blur difference images for selected hair pixels of the hair strand 325. The minimum value of the blur difference values plotted in FIG. 4B is significantly more consistent after smoothing was applied. The depth estimate plot includes a line 431 for the results of smoothed blur difference matching for the selected pixels along the hair strand 325. The errors in the depth estimate values of the plot 420 are significantly reduced compared with raw blur difference matching line 432. Even if oriented smoothing is applied to the raw blur difference matching depth estimate 432, the depth errors will still be significantly larger than the errors in the depth estimate from the smoothed blur difference matching method 431. The plots of FIGS. 4A, 4B and 4C demonstrate how smoothed blur difference matching significantly improves the accuracy of depth estimation for a fine structure such as the hair strand 325.

In addition to the output depth map described above, a confidence map can also be produced. The confidence map is an estimate of the depth accuracy for each pixel. High contrast fine structure changes rapidly with increasing blur and produces large blur differences. The confidence is estimated for fine structure by calculating the amount of variation in the smoothed blur difference for each pixel. Calculating the amount of variation in the smoothed blur difference for each pixel creates a high resolution confidence map for fine structure.

The depth map and the confidence map together give a consistent high resolution and high confidence map of the depth of fine structure in a scene. The high resolution map may then be used to improve the accuracy and resolution of depth mapping at the boundaries of objects in the scene, in particular at the boundaries of a subject in the foreground seen against the background of the scene.

Figure 7:
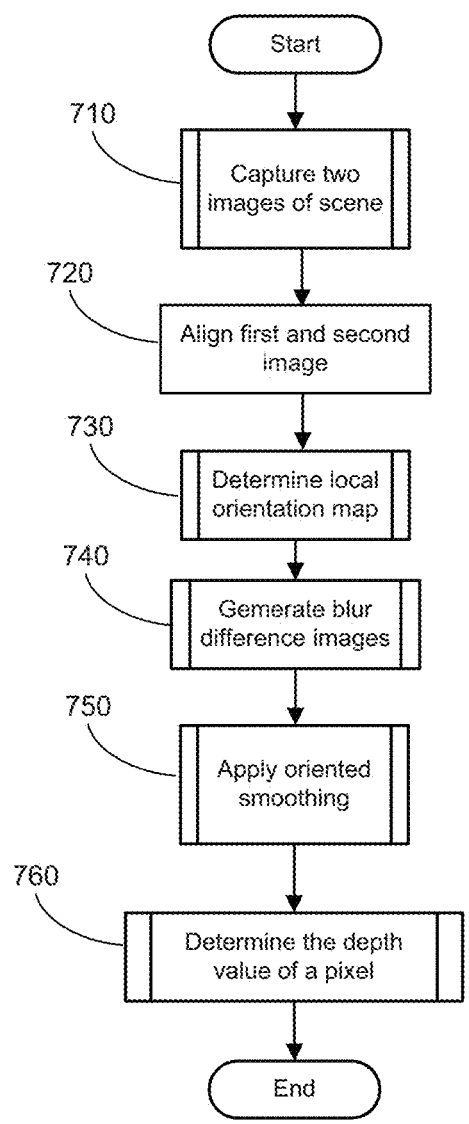
FIG. 7 is a schematic flow diagram showing a method of determining a depth value of a fine structure pixel in a first image of a scene using a second image of the scene.
Figure 8:
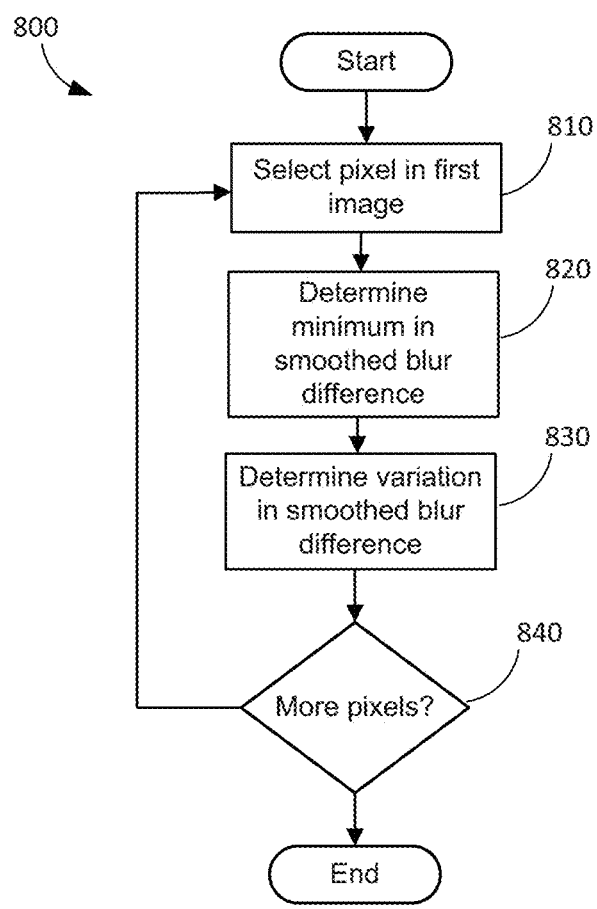
FIG. 8 is a schematic flow diagram showing a method of determining the depth value of a pixel as used in the method of FIG. 7.
Figure 9:
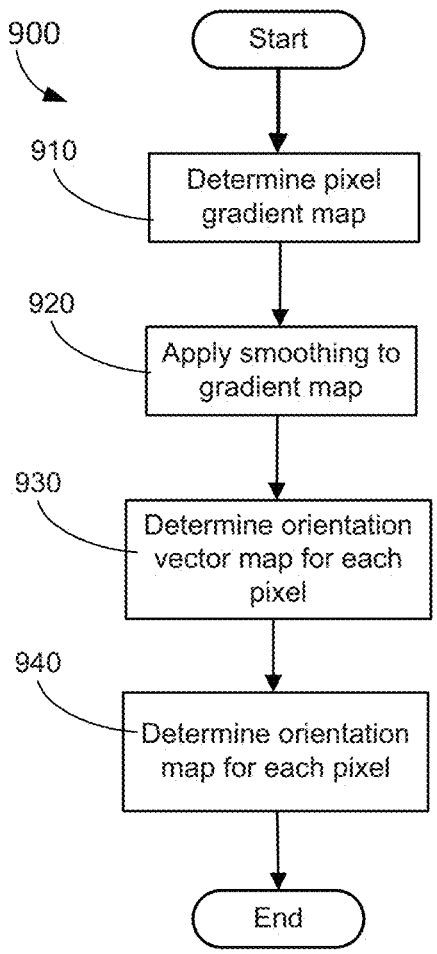
FIG. 9 is a schematic flow diagram showing a method of determining a local orientation map as used in the method of FIG. 7.

FIG. 7 is a flow chart showing a method 700 of determining a depth value of a fine structure pixel in a first captured image of a scene using a second captured image of the scene. The depth value is determined using fine structure depth from defocus (DFD). The method 700 may be implemented as one more software code modules of the software application program 133 resident in the ROM 160 of the device 101 and being controlled in their execution by the controller 102.

In capturing step 710, the two images (i.e., the first and second captured images) of the scene are captured by the device 101 using the controller 102. Each of the images are captured at step 710 using different camera parameters (or "image capture" parameters). The two images may be stored in RAM 170. The device 101 may be set up and aimed at the scene prior to the two images being captured. The first captured image is then captured with a lens focus distance $z_i$ 225 at first focus, zoom and aperture settings. The first focus may be considered a best focus for a subject of the scene. The second captured image of the scene is captured with the lens focus distance $z_i$ 225 which is offset by a focus bracket step size $z_b$, such as 30 µm.

Alternatively, other camera parameters (or "image capture parameters") of the device 101 can be changed between the two (2) images being captured, in order to change the relative blur between the captured images for objects at different distances. For example, the alternative camera parameters may include aperture where an aperture change is made based on relative aperture of the lens 210 of the device 101. As another example, the alternative camera parameters may include focal length change where a focal length change is made to the focal length of the lens 210 of the device 101.

In aligning step 720, the first and second captured images are aligned using the controller 102. The alignment compensates for changes in rotation, magnification and translation between the first and second captured images. For example, magnification changes can occur with changes in focal length in an effect known as focus breathing. After alignment, one of the two captured images (e.g., the first captured image) is affine transformed to match the alignment of the other captured image (e.g., the second captured image). For example, the first captured image is transformed to match the second captured image. The alignment and affine transformation are performed with high accuracy, such as one (1) pixel or better, to enable the high spatial resolution of fine structure depth from defocus (DFD).

An example method of high accuracy alignment, which may be used at step 720, is to Fourier transform both the first and second captured images and perform a log polar transform on the Fourier transformed first and second captured images to determine two log-polar images. The two log-polar images are correlated to determine two correlation images. Each of the correlation images contains a correlation peak whose position represents the scale and angle between the first and second captured images. The first correlation image is rectified using a high-quality affine transform to be the same scale and orientation as the second correlation image to generate first and second transform images. The determined transform images may be stored in RAM 160.

The relative translation between the transformed first image and the transformed second image can be detected using phase correlation. An example of high accuracy affine transformation for small angles is "sinc interpolation" in a scanline algorithm, such as the Catmull algorithm.

In local map determination step 730, a local orientation map is determined using the gradient orientation of one of the first and second captured images. For example, the first image can be used because the subject will be at best focus and the local orientation estimation will be more reliable for fine structures around the edge of the subject. The determined local orientation map may be stored in the RAM 160 by the controller 102. A method 900 of determining a local orientation map, as executed at step 730, will now be described with reference FIG. 9. The method 900 may be implemented as one more software code modules of the software application program 133 resident in the ROM 160 of the device 101 and being controlled in their execution by the controller 102.

The method 900 begins in pixel gradient map determination step 910, where a pixel gradient map is determined using the controller 102. The gradient map determined at step 910 is in the form of a gradient structure tensor in accordance with Equation (12), as follows:

$$\begin{pmatrix} S_{xx} & S_{xy} \\ S_{xy} & S_{yy} \end{pmatrix} = \begin{pmatrix} \frac{\partial g_1}{\partial x} \cdot \frac{\partial g_1}{\partial x} & \frac{\partial g_1}{\partial x} \cdot \frac{\partial g_1}{\partial y} \\ \frac{\partial g_1}{\partial x} \cdot \frac{\partial g_1}{\partial y} & \frac{\partial g_1}{\partial y} \cdot \frac{\partial g_1}{\partial y} \end{pmatrix} \quad (12)$$

where $S_{xx}$, $S_{xy}$, and $S_{yy}$ are images which are the elements of the gradient structure tensor.

An alternative output of step 910 is a gradient map in the form of an image $S_x$ of the x gradient for each pixel and an image $S_y$ of they gradient for each pixel.

In applying step 920, smoothing is applied to the gradient map using the controller 102. The smoothed gradient map may be stored in the RAM 170 by the controller 102. Each image in the gradient map is isotropically smoothed, for example by convolution with a radial Gaussian kernel with kernel width 0.5 pixels.

In determining step 930, an orientation vector map is determined for each pixel of the gradient map, using the controller 102. The orientation vector map may be stored in the RAM 170. If the gradient map is in the form of a gradient structure tensor, then an orientation vector map is formed at step 930 by determining a second eigenvalue $\lambda_2$ and eigenvector $v_2$ of the gradient structure tensor in accordance with Equations (13) and (14), as follows:

$$\lambda_2 = \frac{1}{2}\left(S_{xx} + S_{yy} - \sqrt{(S_{xx} - S_{yy})^2 + 4S_{xy}^2}\right) \quad (13)$$

$$v_2 = \begin{pmatrix} \lambda_2 - S_{yy} \\ S_{xy} \end{pmatrix}. \quad (14)$$

If the gradient map is in the form of the image gradients $S_x$ and $S_y$, then an orientation vector map is formed from the image gradients at step 930, in accordance with Equation (15), as follows:

$$v_2 = \begin{pmatrix} S_x \\ S_y \end{pmatrix}. \quad (15)$$

In determining step 940, an orientation map is determined for each pixel using the controller 102. The determined orientation map may be stored in the RAM 170. In step 940, the angle of the vector orientation map is determined. If the vector orientation map is formed from the image gradients, then the angle is doubled and wrapped at $2\pi$ to convert angles into orientations. The orientation map determined at step 940 is a local orientation map, which may be stored in the RAM 170. The local orientation map contains an estimate of the angle of the tangential direction of the gradient at each pixel. The estimate of the angle of the tangential direction of the gradient at each pixel is called the edge tangent angle.

Figure 10:
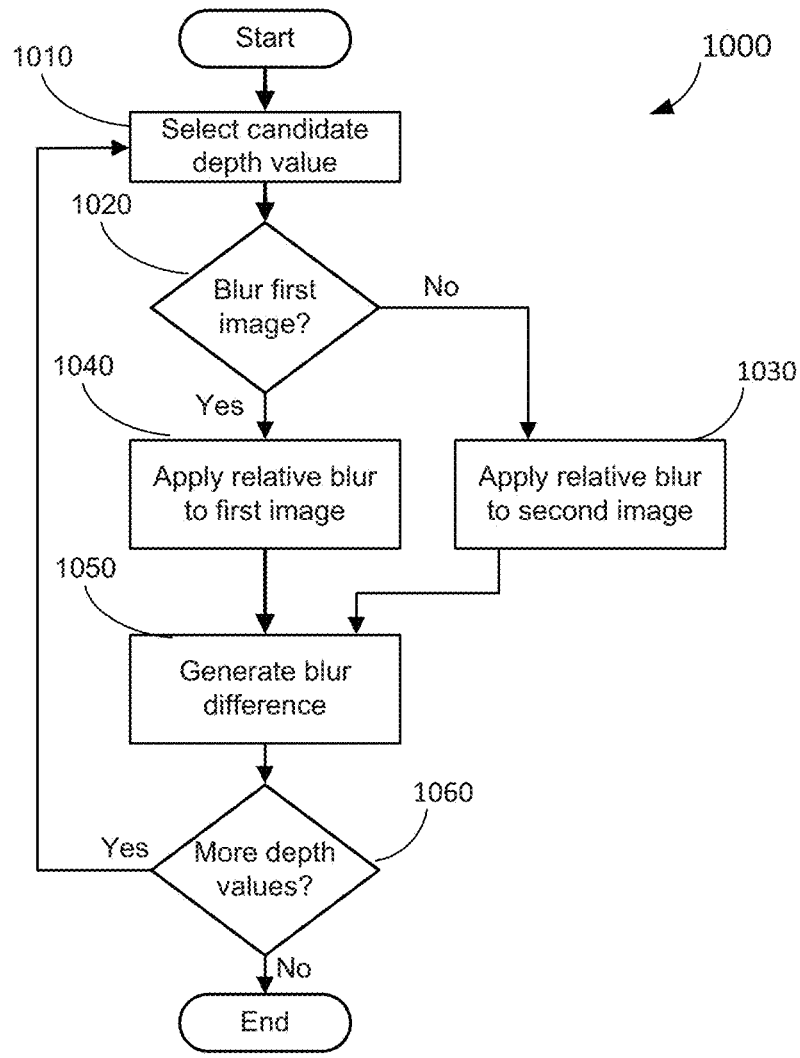
FIG. 10 is a schematic flow diagram showing a method of generating a set of blur difference images as used in the method of FIG. 7.

In generating step 740, the controller 102 is used for generating a set of blur difference images. As described below, the set of blur difference images is generated at step 740 from either the first or second captured images and a series of blurred images formed from the first or second captured images, each blur difference image corresponding to one of a plurality of depth values. FIG. 10 is a flow chart showing a method 1000 of generating the set of blur difference images, as executed at step 740. As described below, the method 1000 is used for blurring the first captured image or the second captured image depending on the relation between the depth and focus bracket step size for the first and second captured images. The method 1000 may be implemented as one more software code modules of the software application program 133 resident in the ROM 160 of the device 101 and being controlled in their execution by the controller 102.

The method 1000 begins in selecting step 1010, where a depth value is selected from a set of possible object depths within a working range, using the controller 102. The depth value is expressed as an image defocus distance $z_d$. For example, a set of sixty-one (61) possible image defocus distances can be selected at equal intervals within a working range of −0.2 μm to 0.1 μm. The set of sixty-one (61) possible image defocus distances may be used with a direct search in step 820 as described below to determine the minimum smoothed blur difference. As described below, the blur difference images may be generated based on a direct search over a predetermined number of steps in depth within a working range.

Alternatively, the blur difference images may be generated based on an optimised search for a minimum smoothed blur difference. Depth values may be selected using such an optimised search for the minimum smoothed blur difference. The optimised search may be bracketing, Brent's method or golden section search.

In decision step 1020, a test is performed using the controller 102 to determine whether to apply blurring to the first captured image or the second captured image. If the depth $z_d$ associated with the depth image satisfies the relation $2z_d < z_b$, then control proceeds to blurring step 1040 where blurring is applied to the first captured image using the controller 102. Otherwise, control proceeds to blurring step 1030, where blurring is applied to the second captured image using the controller 102. The blurring test executed at step 1020 is used to ensure that the relative blurring applied in step 1030 or 1040 increases the blur radius and blurs the image being processed, rather than decreasing the blur radius and sharpening the image being processed. Sharpening the image amplifies imaging noise, which lowers the signal to noise ratio (SNR) in subsequent steps.

In steps 1030 and 1040, a relative blur is applied to one of the captured images. Steps 1030 and 1040 are performed using a Gaussian beam waist point spread function (PSF) model by calculating the relative blur kernel radius, $\sigma_r$, in accordance with Equations (16), (17) and (18) below:

$$\alpha = \sin^{-1} \frac{1}{2A_v} \quad (16)$$

$$w_0 = \frac{\lambda}{\pi \alpha} \quad (17)$$

$$\sigma_r = \frac{\lambda}{\pi w_0} \sqrt{|z_b(z_b - 2z_d)|} \quad (18)$$

where $\lambda$ is the wavelength of light. An example value for $\lambda$ for the green channel in a captured image is five hundred and fifty (550) nm. An alternative method for setting the relative blur kernel radius is to use Equation (2) to derive an expression for the radius with respect to the focus bracket step size $z_b$ and the image defocus distance $z_d$. Another alternative method for setting the relative blur kernel radius is to use a stored calibration table of relative blur kernel radius values for each image defocus distance.

The captured image (i.e., the first or second captured image) is convolved with a radially isotropic 2D Gaussian kernel generating a blurred captured image. The spread of the 2D Gaussian function is characterised by the standard deviation, or radius $\sigma_r$.

In generating step 1050, the controller 102 is used for generating a blur difference image is according to Equation (10) by calculating the square of the difference of the blurred captured image (e.g., the first captured image) and the other captured image (e.g., the second captured image). An alternative method of generating a blur difference image is to determine the absolute value of the difference of the blurred captured image and the other captured image. The blur difference image generated at step 1050 is added to a set of blur difference images configured within 170.

In decision step 1060, a check is performed, using the controller 102, to determine whether there are additional depths at which to search for a minimum in the blur difference. If there are more depths remaining, then control returns to step 1010. If there are no more depths, then the method 1000 concludes.

The method 700 continues at smoothing step 750, where the controller 102 is used for smoothing each of the blur difference images to generate smoothed difference images having increased coherency of fine structure. Pixel values in a difference image region of each of the blur difference images in the set are smoothed so as to generate the smoothed difference images, the difference image regions corresponding to a fine structure region in the first captured image. The smoothing is applied to each of the blur difference images in the set of blur difference images in accordance with the gradient orientations determined for each of a plurality of fine structure pixels in a fine structure region of the first captured image.

Figure 11:
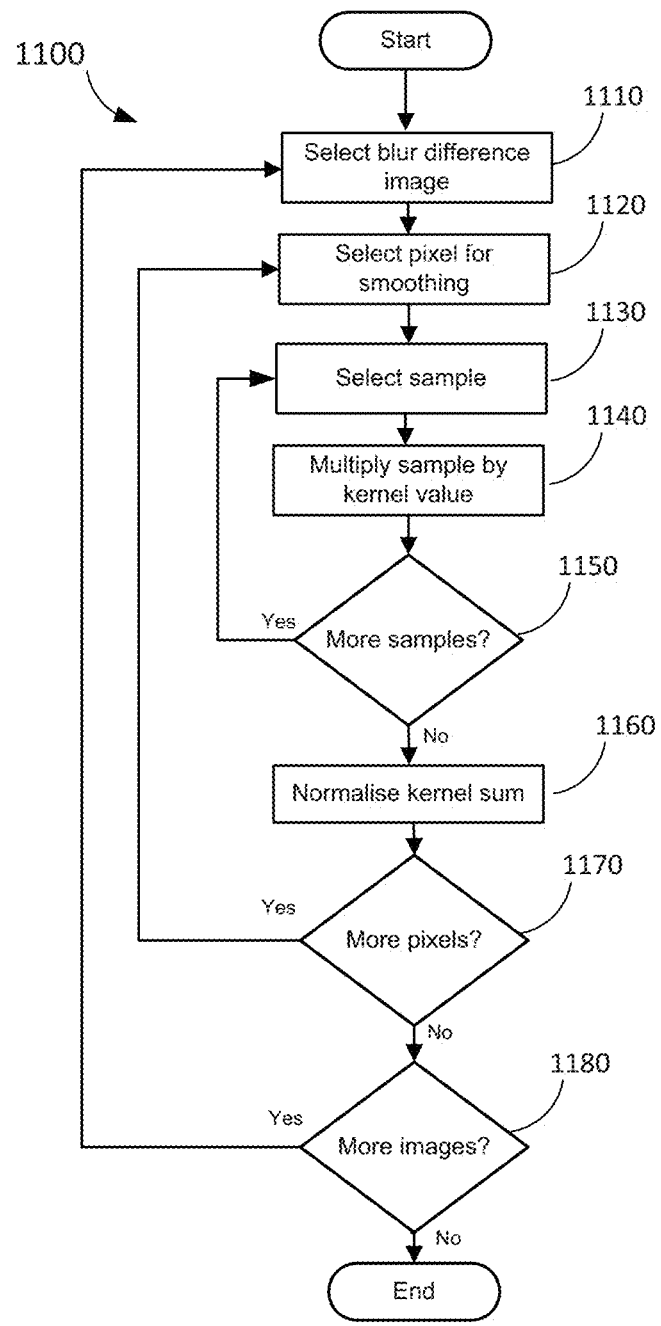
FIG. 11 is a schematic flow diagram showing a method of smoothing a blur mage to generate a smoothed difference image as used in the method of FIG. 7.

The oriented smoothing is performed using edge tangent convolution (ETC). In edge tangent convolution (ETC), a spatially varying 1D Gaussian kernel is convolved with a blur difference image. FIG. 11 is a flow chart showing a method 1100 of smoothing a blur image as executed at step 750.

The method 1100 may be implemented as one more software code modules of the software application program 133 resident in the ROM 160 of the device 101 and being controlled in their execution by the controller 102.

The method 1100 begins in selecting step 1110, where a blur difference image is selected by the controller 102 from the set of blur difference images. Then in selecting step 1120 a pixel in the blur difference image is selected using the controller 102. A kernel sum value is set to zero (0) and a kernel normalization value is set to zero (0). The edge tangent angle for the pixel is selected for the corresponding pixel in the local orientation map. In selecting step 1130, the edge tangent angle is used to select samples for multiplication with the smoothing kernel.

The samples are selected at step 1130 along a sample line which is a straight line running through the selected pixel (e.g., 510) of the blur difference image, as illustrated in FIG. 5, where the angle of the sample line is the edge tangent angle. The mid-point of the sample line is on the selected pixel of the blur difference image. Samples are selected at intervals of at most one (1) pixel in distance along the sample line. The values of the samples are calculated using linear interpolation. If the edge tangent angle $\beta$ is between $\pi/4$ and $3\pi/4$, then the value of the sample is determined using linear interpolation of the two (2) horizontally closest blur difference image pixels. If the kernel line angle $\beta$ is not between $\pi/4$ and $3\pi/4$, then the value of the sample is determined using linear interpolation of the 2 vertically closest blur difference image pixels. Alternative interpolation methods for selecting samples and determining values of the samples are nearest neighbour, bilinear, or sinc interpolation methods.

The method 1100 continues at multiplying step 1140, where the sample is multiplied by the kernel value and added to the kernel sum. The kernel value is determined using a kernel function which is a one dimensional (1D) Gaussian function of the distance between the sample and the selected pixel of the blur difference image. The spread of the 1D Gaussian function is characterised by the standard deviation or width. An example width of the 1D Gaussian function is three (3) pixels. The kernel value is added to the kernel normalisation value. An alternative kernel function is a 1D box function which is one (1) inside a predetermined width relative to the selected pixel in the blur difference image and zero (0) outside that width.

In decision step 1150, a check is performed to test whether more kernel samples are needed. The samples are selected within a cutoff distance along the kernel line. An example cut off distance is five (5) times the width of the 1D Gaussian function. If more samples are needed, then control returns to step 1130. If no more samples are needed, then control moves to normalizing step 1160. In step 1160, the kernel sum is normalized using the controller 102 by dividing the kernel sum by the kernel normalization value.

In decision step 1170, a check is performed to determine if there are more pixels in the selected blur difference image to be processed. If there are more pixels to be processed then control returns to step 1120. If there are no more pixels to be processed, then a smoothed blur difference image is added to a set of smoothed blur difference images configured within RAM 170 and control moves to step 1180. In decision step 1180 if there are more blur difference images in the set of blur difference images to be processed, then flow returns to step 1110. If there are no more blur difference images to be processed, then the method 1100 concludes. Step 750 is complete following execution of the method 1100 and a set of smoothed blur difference images is stored in RAM 170.

In analysis step 760, the controller 102 is used for analysing the smoothed blur difference for each of a plurality of fine structure pixels in the first captured image, by selecting one of the smoothed blur difference images for each of the plurality of fine structure pixels in the first captured image. The smoothed difference image is selected according to a difference value at a pixel in the first captured image. The controller 102 is then used for determining the depth value of the fine structure pixel corresponding to the selected smoothed blur difference image. A method 800 of determining the depth value of a pixel, as executed at step 760, will now be described with reference to FIG. 8. The method 800 may be implemented as one more software code modules of the software application program 133 resident in the ROM 160 of the device 101 and being controlled in their execution by the controller 102.

The method 800 begins at selecting step 810, where the controller 102 is used for selecting one of a plurality of fine structure pixels in the first captured image.

Then in determining step 820, the minimum value of the smoothed blur difference is determined using a direct search by testing the pixels in the set of smoothed blur difference images. The pixels tested at step 820 correspond to the selected pixel in the first captured image. The pixels tested at step 820 may form a fine structure region of the first captured image. The smoothed blur difference image with the minimum value from within the tested pixels and the image defocus distance $z_d$ corresponding to the selected smoothed blur difference image, are selected using the controller 102. The controller 102 is also used at step 820 for determining the depth value of the pixel corresponding to the selected smoothed blur difference image. The selected image defocus distance $z_d$ is assigned as the depth value of the pixel selected at step 810 and the depth value is stored in a depth map configured within RAM 170. The depth value represents a depth measurement for fine structure in the scene captured in the first captured image. The depth measurement may be determined from the depth value associated with each of a plurality of pixels in the fine structure region of the first captured image.

An alternative method of determining the depth value is to use an optimised search algorithm to determine image defocus distance at which the smoothed blur difference is at a minimum.

Another alternative method of determining the depth value is to select five (5) image defocus distance values around an identified minimum smoothed blur difference and use the smoothed blur difference values at the selected pixel to interpolate a higher accuracy determination of the image defocus distance using a parabolic fit.

The method 800 continues at determining step 830, where the variation in the smoothed blur difference at the selected pixel is determined using the controller 102. A subset of difference values are collected from the set of smoothed blur difference images configured in RAM 170, at the pixels corresponding to the selected pixel. The variation is determined at step 830 as the difference between the maximum and minimum of the subset of difference values. The variation in the smoothed blur difference at the selected pixel is assigned as a confidence value of the depth value at the selected pixel in the first captured image. The determined confidence value may be used to generate a confidence signal. Such a confidence signal is very high resolution, and may be used to isolate a confident depth signal for fine structure such as individual hair strands.

A confidence normalisation image is generated at step 830 by convolving the first captured image with a two dimensional (2D) Gaussian kernel with a small blur radius, such as two (2) pixels. The confidence value is normalized by the value of the confidence normalisation image and the normalised confidence value is stored in a confidence map configured within the RAM 170.

An alternative method of determining the confidence value at step 830 is to determine the difference between the minimum of the difference values and the difference value at a predetermined depth value offset from the minimum smoothed blur difference value.

Another alternative method of determining the confidence value at step 830 is by determining a fluctuation in the difference values. The determined fluctuation in the difference values is normalized by a local cross-correlation of the two captured images as described below. For example, let $b_i(x,y)$ be the ith smoothed blur difference image from the set of smoothed blur difference images. A confidence measure is defined that is based on how smooth the error curve is, so that the more the error curve fluctuates, the lower the confidence, in accordance with Equations (19) and (20), as follows:

$$conf(x, y) = \begin{cases} \dfrac{\left(b_1(x,y) - \min_i b_i(x,y)\right) + \left(b_N(x,y) - \min_i b_i(x,y)\right)}{\sum_i |\Delta b_i(x,y)|} \times xcorr_{x,y}(g_1, g_2) & \text{if } \sum_i |\Delta b_i(x,y)| > 0 \\ 0 & \text{if } \sum_i |\Delta b_i(x,y)| = 0 \end{cases} \quad (19)$$

where N is the number of depth layers, $xcorr_{x,y}(g_1,g_2)$ is the cross-correlation of the two captured images at pixel (x,y), and $$\Delta b_i = b_{i+1}(x,y) - b_i(x,y). \quad (20)$$

Then at decision step 1240, if there are more pixels in the first captured image to process, then flow returns to step 1210. Otherwise the method 800 concludes and the depth map and confidence map are stored in RAM 170.

Alternative arrangements can be used to reduce the memory required for the fine structure depth from defocus (DFD) methods described above. For example, in the method 700, the blur difference images may be generated and smoothed one at a time, and then an incremental statistical algorithm used to update the maximum and minimum smoothed blur difference values and the image defocus distances corresponding to those values for each pixel.

Another method to further improve the efficiency of the fine structure depth from defocus (DFD) methods described above is to select fine structure pixels within the full image that are likely to contain fine structure as a first step. For example, the methods described above may be configured for selecting fine structure pixels of the first captured image for application of fine structure depth from defocus (DFD) based on a threshold on the gradient magnitude of the first captured image. An alternative method of selecting fine structure pixels for fine structure depth from defocus (DFD) is to use a threshold on local variance determined in a sliding 3×3 pixel window within the first captured image. Another alternative method is to select all of the pixels in the first captured image as fine structure pixels.

Figure 6:
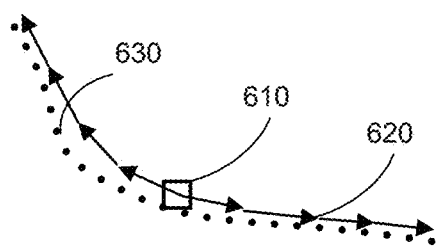
FIG. 6 is a diagram illustrating line integral convolution.

As described above, at step 750, the blur differences images are smoothed using edge tangent convolution (ETC). Smoothing is applied to each of the blur difference images to generate smoothed difference images in accordance with the gradient orientation of the first captured image using edge tangent convolution (ETC). Alternatively, oriented smoothing may be performed at step 750 using line integral convolution (LIC), so that the blur difference images are smoothed using line integral convolution. FIG. 6 illustrates line integral convolution (LIC) for a single pixel 610 lying on a fine structure feature 620 in a blur difference image. The angle of tangential steps between samples 630 is updated at each step along the feature 620. Resulting samples are multiplied by smoothing kernel values, and resulting values are summed to create a smoothed blur difference pixel value at 610.

As described above, at sub-step 1130, kernel samples are selected. Using edge tangent convolution (ETC) as described above, the kernel samples are selected along a straight line passing through the pixel selected for smoothing at step 1120. In another arrangement, line integral convolution (LIC) may be used at step 1130, where samples are selected to flow tangentially along the local orientations at each sample step within the kernel. If the fine structure is curved, then line integral convolution (LIC) may be used to follow the curve of the fine structure. Accordingly, line integral convolution may be used to improve the tolerance to curvature in a fine structure.

The methods described above may be used for segmenting hair at the boundary of a subject in portrait photograph. To perform such segmentation, the device 101 may be used to capture two images with different lens focus distances. The two captured images are used to generate a low resolution depth map using a method, such as blur match difference depth from defocus (DFD) with a large square window smoothing region. A low resolution depth map may be used to determine a depth edge region for the subject, such as the hair and shoulders. The depth edge region is marked as unknown depth. Fine structure depth from defocus (DFD) is then applied to the edge region to create a high confidence foreground fine structure map. In the fine structure map, single hairs may be identified as being in the foreground saving a user a lot of time that would otherwise be required to manually identify each hair.

A user may mark a known foreground and known background region on the captured image. The boundary between the two known regions is marked as unknown depth. Fine structure depth from defocus (DFD) may then be used to improve the spatial resolution and segmentation accuracy in an unknown region.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of determining a depth value of a fine structure pixel in a first image of a scene using a second image of the scene, the method comprising:
   determining a gradient orientation for each of a plurality of fine structure pixels in the first image;
   generating difference images from the second image and a series of blurred images formed from said first image, each said difference image corresponding to one of a plurality of depth values;
   generating smoothed difference images by applying oriented smoothing to each of the difference images with an angle of the oriented smoothing being determined according to the determined gradient orientation, the smoothed difference images having increased coherency of fine structure;
   selecting, for each of the plurality of fine structure pixels in the first image, one of the generated smoothed difference images having a minimum smoothed blur difference value at a corresponding pixel of the generated smoothed difference image; and
   determining the depth value of the fine structure pixel corresponding to the selected smoothed difference image.

2. The method according to claim 1, wherein the gradient orientations are determined for each of a plurality of pixels in a fine structure region of the first image.

3. The method according to claim 1, further comprising smoothing pixel values in a region of each of the set of difference images, the difference image regions corresponding to a fine structure region in the first image, so as to generate said smoothed difference images.

4. The method according to claim 1, wherein said smoothed difference image is selected according to a difference value at a pixel.

5. The method according to claim 1, further comprising determining a depth measurement for fine structure in the scene from the depth value associated with each of a plurality of pixels in a fine structure region of the first image.

6. The method according to claim 1, wherein the difference images are smoothed using edge tangent convolution.

7. The method according to claim 1, wherein the difference images are smoothed using a line integral convolution.

8. The method according to claim 1, further comprising determining a confidence value for each of said pixels in the first image from the difference between a maximum and a minimum of a subset of difference values of the smoothed difference images at each of said pixels in the first image, wherein said subset of difference values corresponds to smoothed difference images that lie within a predetermined depth of each of said pixels in the first image.

9. The method according to claim 1, further comprising:
determining a confidence value for each of said pixels in the first image from a fluctuation in difference values of the smoothed difference images at each of said pixels in the first image, wherein said fluctuation is determined from the difference between a minimum difference value and the difference value of the smoothed difference image, and a sum of the absolute difference between difference values of the smoothed difference images of successive depth and local cross-correlation of said first and second captured images.

10. The method according to claim 1, further comprising blurring the first captured image or the second captured image depending on the relation between the depth and the focus bracket step size.

11. The method according to claim 1, wherein the difference images are generated based on a direct search over a predetermined number of steps in depth within a working range.

12. The method according to claim 1, wherein the difference images are generated based on an optimised search for a minimum smoothed blur difference.

13. The method according to claim 1, wherein the gradient orientations are determined using the smoothed local gradient.

14. The method according to claim 1, wherein the gradient orientations are determined using the gradient structure tensor.

15. The method according to claim 1, wherein the first and second image are captured using different camera parameters including at least one of focus and aperture.

16. The method according to claim 1, further comprising selecting a pixel of the first image based on a threshold on gradient magnitude of the first image.

17. The method according to claim 1, further comprising selecting a pixel of the first image based on a threshold on local variance of the first image.

18. An apparatus for determining a depth value of a fine structure pixel in a first image of a scene using a second image of the scene, the apparatus comprising:
a memory for storing data and a computer program;
a processor coupled to the memory for executing the computer program, the computer program having instructions for:
determining a gradient orientation for each of a plurality of fine structure pixels in the first image;
generating difference images from the second image and a series of blurred images formed from said first image, each said difference image corresponding to one of a plurality of depth values;
generating smoothed difference images by applying oriented smoothing to each of the difference images with an angle of the oriented smoothing being determined according to the determined gradient orientation, the smoothed difference images having increased coherency of fine structure;
selecting, for each of the plurality of fine structure pixels in the first image, one of the generated smoothed difference images having a minimum smoothed blur difference value at a corresponding pixel of the generated smoothed difference image; and
determining the depth value of the fine structure pixel corresponding to the selected smoothed difference image.

19. A non-transitory computer readable medium comprising a computer program stored thereon for determining a depth value of a fine structure pixel in a first image of a scene using a second image of the scene, the program comprising:
code for determining a gradient orientation for each of a plurality of fine structure pixels in the first image;
code for generating difference images from the second image and a series of blurred images formed from said first image, each said difference image corresponding to one of a plurality of depth values;
code for generating smoothed difference images by applying oriented smoothing to each of the difference images with an angle of the oriented smoothing being determined according to the determined gradient orientation, the smoothed difference images having increased coherency of fine structure;
code for selecting, for each of the plurality of fine structure pixels in the first image, one of the generated difference images having a minimum smoothed blur difference value at a corresponding pixel of the generated smoothed difference image; and
code for determining the depth value of the fine structure pixel corresponding to the selected smoothed difference image.

20. A method of determining a confidence value of a fine structure pixel in a first image of a scene using a second image of the scene, the method comprising:
generating difference images from the second image and a series of blurred images formed from the first image, each said difference image corresponding to one of a plurality of depth values; and
determining the confidence value of the fine structure pixel in the first image based on a difference between a maximum and minimum of a subset of blur difference values at a corresponding pixel of the difference images, wherein the subset of blur difference values corresponds to smoothed difference images that lie within a predetermined depth of each of the pixels in the first image.

21. The method according to claim 20, wherein said difference is determined at a predetermined depth value offset from a selected difference image.

22. The method according to claim 20, further comprising determining a fluctuation in difference values, normalised by local cross-correlation of said first and second captured images.

23. An apparatus for determining a confidence value of a fine structure pixel in a first image of a scene using a second image of the scene, the apparatus comprising:
a memory for storing data and a computer program;
a processor coupled to the memory for executing the computer program, the computer program having instructions for:
generating difference images from the second image and a series of blurred images formed from said first image, each said difference image corresponding to one of a plurality of depth values;
determining the confidence value of the fine structure pixel in the first image based on a difference between a maximum and minimum of a subset of blur difference values at a corresponding pixel of the difference images, wherein the subset of blur difference values corresponds to smoothed difference images that lie within a predetermined depth of each of the pixels in the first image.

24. A non-transitory computer readable medium comprising a computer program stored thereon for determining a confidence value of a fine structure pixel in a first image of a scene using a second image of the scene, the program comprising:

code for generating difference images from the second image and a series of blurred images formed from said first image, each said difference image corresponding to one of a plurality of depth values;

code for determining the confidence value of the fine structure pixel in the first image based on a difference between a maximum and minimum of a subset of blur difference values at a corresponding pixel of the difference images, wherein the subset of blur difference values corresponds to smoothed difference images that lie within a predetermined depth of each of the pixels in the first image.

* * * * *